United States Patent
Thoelke et al.

(10) Patent No.: US 10,804,824 B2
(45) Date of Patent: Oct. 13, 2020

(54) METHOD AND CIRCUIT ARRANGEMENT FOR DETERMINING THE POSITION OF A ROTOR IN AN ELECTRIC MOTOR

(71) Applicant: SCHAEFFLER TECHNOLOGIES AG & CO. KG, Herzogenaurach (DE)

(72) Inventors: Andreas Thoelke, Nuremberg (DE); Christian Karbacher, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/336,241

(22) PCT Filed: Nov. 21, 2017

(86) PCT No.: PCT/DE2017/101001
§ 371 (c)(1),
(2) Date: Mar. 25, 2019

(87) PCT Pub. No.: WO2018/095482
PCT Pub. Date: May 31, 2018

(65) Prior Publication Data
US 2019/0280631 A1   Sep. 12, 2019

(30) Foreign Application Priority Data
Nov. 22, 2016  (DE) .................. 10 2016 222 986

(51) Int. Cl.
*H02P 6/185* (2016.01)
*H02P 6/00* (2016.01)
*H02P 6/18* (2016.01)

(52) U.S. Cl.
CPC .............. *H02P 6/185* (2013.01); *H02P 6/006* (2013.01); *H02P 6/188* (2013.01)

(58) Field of Classification Search
CPC .................. H02P 6/185; H02P 6/188
(Continued)

(56) References Cited

U.S. PATENT DOCUMENTS

| | | | | |
|---|---|---|---|---|
| 6,441,572 B2 * | 8/2002 | Batzel | ..................... | H02P 6/185 318/400.12 |
| 6,731,082 B2 * | 5/2004 | Pelonis | ..................... | H02P 6/16 318/400.26 |

(Continued)

FOREIGN PATENT DOCUMENTS

| | | |
|---|---|---|
| DE | 19838227 A1 | 2/2000 |
| DE | 102005056444 A1 | 6/2006 |
| DE | 102005022714 A1 | 11/2006 |

OTHER PUBLICATIONS

Micro Linear: Sensorless Smart-Start BLDG PWM Motor Controller, Apr. 30, 1997, pp. 1-16, XP002778629, San Jose, CA, 18 pages.
(Continued)

*Primary Examiner* — David Luo
(74) *Attorney, Agent, or Firm* — Brooks Kushman P.C.

(57) ABSTRACT

A circuit, comprising a plurality of phase windings in an electric motor, an inverter configured to excite the phase windings by a sequence of voltage pulses including a plurality of successive voltage pulses that a current can be set in each of the phase windings, wherein the voltage pulses are selected in such a manner that a positive and a negative current are produced in all the phase windings during the voltage pulses, a current sensor for measuring a peak value for the current being set during a duration of each voltage pulse in each phase winding, and an evaluation circuit connected to the current sensor, wherein the evaluation circuit is configured to determine the voltage pulse in the voltage pulse sequence during a duration of which peak current value having a greatest magnitude was measured.

16 Claims, 3 Drawing Sheets

(58) Field of Classification Search
USPC .......................................... 318/400.01, 700
See application file for complete search history.

(56) References Cited

U.S. PATENT DOCUMENTS

| | | | |
|---|---|---|---|
| 7,622,882 B2* | 11/2009 | Hao | H02P 21/18 |
| | | | 318/400.36 |
| 9,853,584 B2* | 12/2017 | Seki | H02P 23/14 |

OTHER PUBLICATIONS

International Search Report for PCT Application No. PCT/DE2017/101001, dated Mar. 13, 2018, 7 pages.

* cited by examiner

METHOD AND CIRCUIT ARRANGEMENT FOR DETERMINING THE POSITION OF A ROTOR IN AN ELECTRIC MOTOR

CROSS-REFERENCE TO RELATED APPLICATIONS

This application is the U.S. National Phase of PCT/DE2017/101001 filed Nov. 21, 2017, which claims priority to DE102016222986.9 filed Nov. 22, 2016, the entire disclosures of which are incorporated by reference herein.

TECHNICAL FIELD

The disclosure relates to a method for determining the position of a rotor of a camshaft adjuster or a device for changing the compression ratio of an internal combustion engine.

BACKGROUND

Electrical camshaft adjusters have brushless permanent-magnet electric motors. Such electric motors are also referred to as brushless direct current motors, BLDC motors or EC motors (electronically commutated motors). The rotors of such electric motors typically have one or more permanent magnets. As a rule, several phase windings are provided on the stator, which are controlled such that they generate a rotating magnetic field, which carries with it the permanent magnet stator. Ordinarily converters are used to control such electric motors, by which the winding currents can be set in the individual phase windings of the stator.

To enable an efficient control of the phase windings, it is necessary to have knowledge about the position of the rotor. With this knowledge the control of the phase windings can occur depending on the position of the rotor. There are several methods for determining the rotor position. For example, it is known to detect the magnetic flux of the rotor via magnetic sensors and derive the position of the rotor therefrom. As an alternative, optical sensors can be used for detecting the rotor position.

In addition, methods are known in which the currents in the individual phase windings are determined via current sensors, which are arranged in the individual phase windings. In the case of an electric motor with three phase windings accordingly three current sensors are necessary. The individual current sensors may have the highest possible accuracy and be calibrated to one another, in order to reduce measurement errors caused by different measurement behaviors of the individual current sensors. As a result, a certain material and calibration cost arises.

One method for determining the rotor position of a synchronous motor originates from DE 198 38 227 A1. From the publication Sensorless Smart-Start BLDC PWM Motor Controller, company brochure Micro Linear ML4428 from Apr. 16, 1997 a method for operating an electric motor is disclosed that manages without hall sensors and determines the rotor position during operation by using Back EMF. Only during start-up operation is a PWM operation employed to keep the starting time as short as possible. Once the BEMF operation or back-EMF operation has been reached, a change to PWM mode is not provided for and cannot be performed, so that the system has to restart. The method is unsuitable for operating a camshaft adjuster or a device for changing the compression ratio of internal combustion engines, which are operated over long periods of time in PWM operation or for which a change from BEMF operation to PWM operation may take place without restricting the functionality.

SUMMARY

Against this background, the disclosure addresses the problem of facilitating the determination of the position of the rotor with reduced expenditure.

To solve this problem, a method is proposed for determining the position of a rotor of a brushless permanent-magnet electric motor, having a stator which comprises a plurality of, in particular, three, phase windings, wherein the phase windings are excited by a sequence of voltage pulses comprising a plurality of successive voltage pulses, such that a current is set successively in each of the phase windings. The voltage pulses are selected in such a manner that a positive and a negative current is produced in all the phase windings during the voltage pulse sequence, a common current sensor measuring a peak value for the current being set during the duration of each voltage pulse, and the voltage pulse in the voltage pulse sequence being determined during which the peak current value having the greatest magnitude was measured.

According to the disclosure, a common current sensor is used for measuring all currents which are set during the individual voltage pulses of the voltage pulse sequence in the different phase windings of the stator. Any measurement errors have the same effect on the measurement of the currents of all phase windings. A calibration of several current sensors is not necessary. Exclusively those peak current values being set during the different voltage pulses are used to determine the rotor position, so that the influence of measurement errors on the determination of the rotor position is reduced.

The voltage pulses of the voltage pulse sequence are selected in such a manner that at least one positive and one negative current is produced in all the phase windings during the voltage pulse sequence, wherein the negative current flows in the opposite direction to the positive current. In this respect, all of the phase windings of the stator can be excited with the voltage pulse sequence in such a manner that they form a magnetic field acting on the rotor. In the process, the positive current produces a magnetic field in a phase winding whose field lines run opposite to a magnetic field produced by a negative current.

The inductivities of the phase windings are influenced by the position of the permanent-magnet rotor. The inductivity of a phase winding is minimal when the field lines of the magnetic field of the rotor run in the same direction as the field lines of the magnetic field created by the phase winding. In the case of minimal inductivity of the phase winding, the result is a maximum of the current measurable in the phase winding. Therefore, by observing the measured peak values of the current during the individual voltage pulses an inference is possible about the position of the rotor at the time of the application of the voltage pulse on the phase winding. According to the disclosure, the voltage pulse of the voltage sequence is determined during which the peak current value having the greatest magnitude was measured. This voltage pulse can be assigned to the phase winding whose inductivity was observed by the current measurement. In this respect, the determined voltage pulse indicates that the position of the rotor at the time of the determined voltage pulse had the lowest deviation from the alignment of the magnetic field lines of the phase winding excited by the determined voltage pulse. In this respect, the position of the rotor can be determined with a resolution which corresponds to an electrical angle of 180° divided by the number of phase windings.

The method according to the disclosure thus facilitates the determination of the position of the rotor with a reduced expenditure compared to the prior art. In particular, camshaft adjusters and devices for changing the compression ratio of internal combustion engines are subject to high disturbance variables at comparatively low speeds, thus such speeds that, as a rule are not sufficient for a safe BEMF operation. The proposed method permits a rapid and safe operation of the devices through an improved detection accuracy.

The stator of the electric motor may have three phase windings. In the case of an electric motor with three phase windings, the voltage pulse sequence may have six, for example six voltage pulses, which produce positive and negative currents in all three phase windings.

One advantageous embodiment of the disclosure provides that in addition the voltage pulse is determined during which the peak current value having the second greatest magnitude was measured. This voltage pulse can additionally be used to determine the position of the rotor, as a result of which the resolution of the determined position of the rotor becomes smaller. For example, in the case of an electric motor with three phase windings the position of the rotor can be electrically determined with a resolution of 60°, if only the voltage pulse is determined during which the peak current value having the greatest magnitude was measured. If in addition the voltage pulse is determined during which the peak current value having the second greatest magnitude was measured, a resolution of 30° can be electrically achieved.

It is advantageous if in each case, the voltage pulses of the voltage pulse sequence are applied with a parallel connection of the other phase windings via a series connection of a first phase winding, to which the voltage pulse is assigned. In the case of a stator with three phase windings the voltage pulses of the voltage pulse sequence are in each case may be applied via a series connection of a first phase winding, to which the voltage pulse is assigned, are applied with a parallel connection of a second phase winding and of a third phase winding. The voltage pulse is in each case assigned to the first phase winding in the series connection, since the entire current which is being measured by the common current sensor flows through it.

In each case a time delay may be provided between the voltage pulses of the voltage pulse sequence, said time delay in which no voltage is applied via the phase windings. By using the time delay between the voltage pulses a mutual influence of the measurements during succeeding voltage pulses can be reduced.

One advantageous embodiment provides that the phase windings are excited with the voltage pulse sequence in a time frame which is between two control cycles for controlling the phase windings. The control cycles may be PWM control cycles, which are produced by pulse width modulation. The control cycles cause a rotation of the magnetic field produced by the phase windings of the stator and hence a rotation of the motor. The control of the phase windings of the stator may be interrupted in order to apply the voltage pulse sequence for determining the position of the rotor to the phase windings.

In this context it has proven to be advantageous if the phase windings are excited during the control cycles in such manner that a first phase winding is disconnected while a second phase winding and a third phase winding are live. Such a control of the phase windings is also referred to as block commutation, since the currents run essentially in the shape of a block in the phase windings during the control cycles. That means that the current in each of the phase windings is either zero or has a predefined maximum value. In the case of a stator with three phase windings at each point in time during the control cycle two phase windings are always energized and one phase winding is currentless.

The voltage pulse sequence and/or the control cycles may be produced with an inverter. The inverter may have a B6 bridge circuit.

In this context the common current sensor may be arranged in a DC voltage side lead of the inverter. The DC voltage side of the inverter can for example be connected to a DC voltage circuit from which the inverter is supplied. The common current sensor can be connected to the ground potential of the DC voltage circuit or to a positive or negative potential of the DC voltage circuit. In this respect, the total current flowing in the inverter can be measured with the common current sensor.

According to one embodiment of the method, provision is made that the speed of the rotor of the electric motor is determined and the excitation of the phase windings for determining the position of the rotor occurs with the voltage pulse sequence when the speed is less than a predefined speed threshold, and the position of the rotor is determined via a determination of a back EMF of the electric motor when the speed proceeding from a speed that is lower than the predefined speed threshold reaches or exceeds the speed threshold. By back EMF, an induced voltage in the phase windings of the stator in the case of a rotation of the motor is understood. A determination of the rotor position may take place in the case of speeds below the predefined speed threshold by using the voltage pulse sequence and the measurement with the common sensor. That means that an evaluation circuit for measuring the peak current values and for determining the peak current value having the greatest magnitude can be operated with a reduced frequency or scanning rate. As a result, the circuitry cost for the evaluation circuit can be lowered. If the speed is greater or equal to the speed threshold the phase windings are not excited with the voltage pulse sequence, but rather a measured quantity is detected which is indicative of a back EMF of the electric motor. For example, in the case of high speeds the voltage of the currentless phase winding can be used to determine the back EMF.

One embodiment is advantageous in which, when the speed proceeding from a speed that is lower than the predefined speed threshold reaches or exceeds the speed threshold, a control cycle to control the phase windings is executed with an extended duty cycle of the control pulses compared to the immediately preceding control cycle. In this way the torque of the electric motor can be temporarily increased to ensure that the rotor also follows the rotating magnetic field of the stator when the stator is blindly controlled, i.e. without knowledge of the precise position of the rotor. As a result it is possible to perform a control cycle when switching from determining the rotor position by the common current sensor to determining the rotor position via the back EMF. As a result, an influence of the determination of the back EMF in a subsequent control cycle by the voltage pulse sequence can be ruled out.

To solve the initially mentioned problem a circuit arrangement for determining the position of a rotor of a brushless permanent-magnet electric motor having a stator comprising a plurality, particularly three, phase windings is further proposed, wherein the circuit arrangement has:

an inverter for exciting the phase windings by a sequence of voltage pulses comprising a plurality of successive voltage pulses, such that a current is set successively in each of the phase windings. The voltage pulses are selected in such a manner that a positive and a negative current are produced in all the phase windings during the voltage pulse sequence;

a common current sensor for measuring a peak value for the current being set during the duration of each voltage pulse in the respective phase winding; and an evaluation circuit for determining the voltage pulse in the voltage pulse sequence during which the peak current value having the greatest magnitude was measured.

The same advantages can be achieved with the device as described in conjunction with the method for determining the position of the rotor. Likewise, the advantageous embodiments described in conjunction with the method can be used alternatively or in combination with the circuit arrangement.

BRIEF DESCRIPTION OF THE DRAWINGS

Further details and advantages of the disclosure shall be described subsequently on the basis of the exemplary embodiments presented in the drawings. The figures show the following.

DETAILED DESCRIPTION

Figure 1:
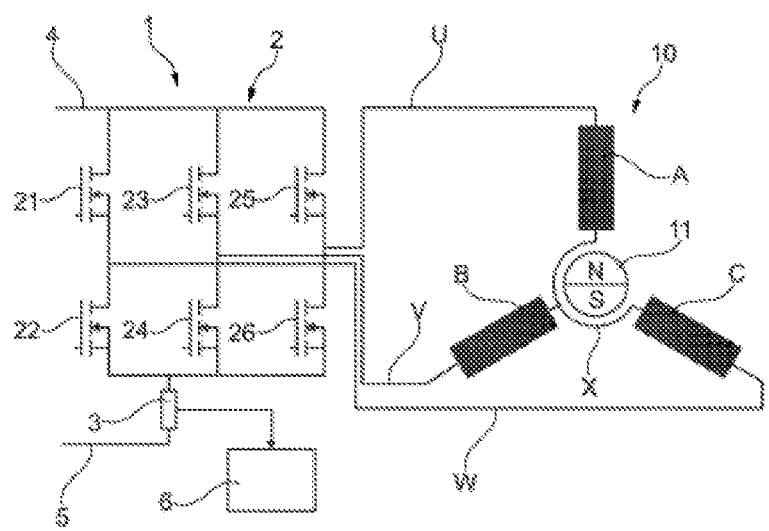
FIG. 1 shows a schematic of a circuit arrangement for determining the position of a rotor of a brushless permanent-magnet electric motor.

In FIG. 1 a schematic of a circuit arrangement 1 for determining the position of a rotor 11 of a brushless permanent-magnet electric motor 10 is shown. The electric motor is a BLDC motor having a stator with three phase windings A, B, C. The rotor 11 has a magnetic north pole N and a magnetic south pole S. The circuit arrangement 1 comprises an inverter 2, which is embodied as a B6 bridge circuit. The inverter 2 has a total of six switches 21, 22, 23, 24, 25, 26, which are designed as power semiconductor switches. The inverter 2 is connected via a first lead 4 and a second lead 5 to a DC voltage circuit. Between the first lead 4 and the second lead 5 a direct current is applied on the inverter 2.

The inverter 2 has three branches which are in each case formed of two switches 21, 22, 23, 24, 25, 26. A first switch 21, 23, 25 of each branch is connected to the first lead 4 and a common potential point U, V, W. A second switch 22, 24, 26 of each branch is connected to the second lead 5 and a common potential point U, V, W. Hence, it is possible to connect the common potential point U, V, W either to the potential of the first lead 4 or of the second lead 5. The common potential points U, V, W are connected to the phase windings A, B, C of the stator of the electric motor 10.

The phase windings A, B, C of the electric motor are interconnected with one another in the manner of a star circuit. That means that all three phase windings A, B, C are connected to a star point X. For operation of the electric motor the switches 21, 22, 23, 24, 25, 26 of the inverter 2 are controlled according to the principle of block formulation such that a rotating magnetic field is obtained, which pulls the permanent-magnet rotor 11 after it. Essentially trapezoid voltages are produced via the phase windings A, B, C, which result in block-shaped currents in the phase windings A, B, C.

For efficient control of the switches 21, 22, 23, 24, 25, 26 it is necessary to know the position of the rotor 11. A method according to a first embodiment of the disclosure is used to determine the position of the rotor 11, in which the phase windings A, B, C are excited with a pulse voltage sequence comprising a plurality of successive voltage pulses, such that a current is successively set in each of the phase windings. The voltage pulses are selected in such a manner that a positive and a negative current is produced in all the phase windings A, B, C during the voltage pulse sequence 100. A common current sensor 3 measures a peak value for the current being set during the duration of each voltage pulse. Further, an evaluation sensor 6 determines the voltage pulse in the voltage pulse sequence during which the peak current value having the greatest magnitude was measured. This voltage pulse can be assigned to the phase winding A, B, C whose inductivity was observed by the current measurement. In this respect, the determined voltage pulse indicates that the position of the rotor 11 at the time of the determined voltage pulse had the lowest deviation from the alignment of the magnetic field lines of the phase winding A, B, C excited by the determined voltage pulse. In this respect, the position of the rotor 11 can be determined with a resolution which corresponds to an electrical angle of 60°.

Figure 2:
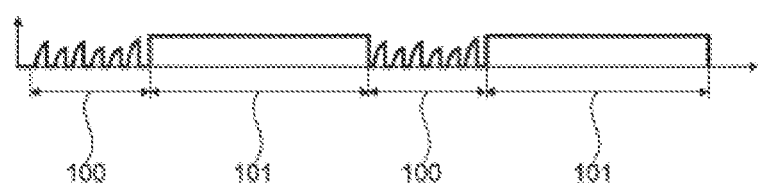
FIG. 2 shows a schematic representation of the chronological sequence of an exemplary embodiment of the method for determining the position of the rotor.

As schematically represented in FIG. 2, the voltage pulse sequence 100 is applied to the phase windings A, B, C, in each case in a time frame which is between two control cycles 101 for controlling the phase windings A, B, C.

The voltage pulse sequence 100 has six successive voltage pulses, wherein each voltage pulse produces a current in each case in one phase winding A, B, C, which can be measured by the common current sensor 3. The voltage pulses are applied by the inverter 1, which may include the switches 21, 22, 23, 24, 25, 26 of the inverter such on the phase windings A, B, C that in each phase winding A, B, C over the course of the voltage pulse sequence one positive current I is measured once and one negative current I opposing the positive current is measured once.

In the representations in FIG. 3 to FIG. 8 the switches 21, 22, 23, 24, 25, 26 of the inverter 1 are not shown for a better overview.

Figure 3:
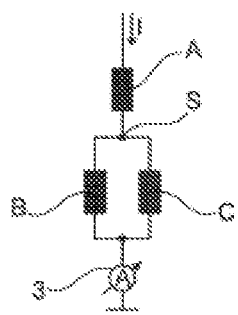
FIGS. 3-8 show different interconnections of the phase windings of the electric motor during individual voltage pulses of the voltage pulse sequence.

FIG. 3 shows an interconnection of the phase windings A, B, C during a first voltage pulse. The first voltage pulse is applied via a series connection of a first phase winding A, which is assigned to the voltage pulse, with a parallel connection of a second phase winding B, and of a third phase winding C. To this end, the switches 25, 22 and 24 are switched to a conductive state and switches 21, 23 and 26 are switched to a blocking state. During the first voltage pulse the current measured with the common current sensor 3 corresponds to the current I through the first phase winding A, wherein the current I flows in the positive direction, thus towards the star point X, through the first phase winding A.

Figure 4:
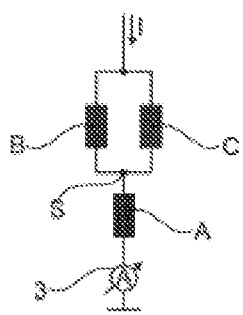

FIG. 4 shows an interconnection of the phase windings A, B, C during a second voltage pulse. The second voltage pulse is likewise applied via a series connection of the first phase winding A with a parallel connection of the second phase winding B and of the third phase winding C. In contrast to the first voltage pulse, the switches 25, 22 and 24 are switched to a blocking state and the switches 21, 23 and 26 are switched to a conductive state. During the second voltage pulse the current measured with the common current sensor 3 corresponds to the current through the first phase winding A, wherein the current I flows in the negative direction, thus away from the star point X, through the first phase winding A.

Figure 5:
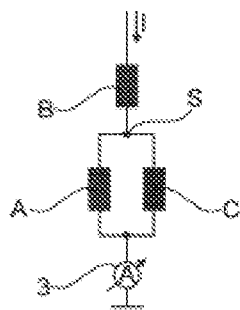

FIG. 5 shows an interconnection of the phase windings A, B, C during a third voltage pulse. The third voltage pulse is applied via a series connection of the second phase winding B, which is assigned to the voltage pulse, with a parallel connection of the first phase winding A, and of the third phase winding C. To this end, the switches 23, 22 and 26 are switched to a conductive state and switches 21, 25 and 24 are switched to a blocking state. During the third voltage pulse the current measured with the common current sensor 3 corresponds to the current I through the second phase winding B, wherein the current I flows in the positive direction, thus towards the star point X, through the second phase winding B.

Figure 6:
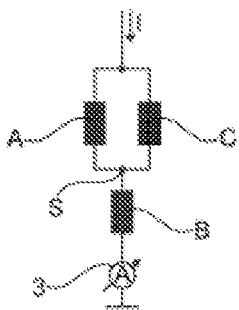

FIG. 6 shows an interconnection of the phase windings A, B, C during a fourth voltage pulse. The fourth voltage pulse, like the third voltage pulse, is applied via a series connection of the second phase winding B, which is assigned to the voltage pulse, with a parallel connection of the first phase winding A and of the third phase winding C. In contrast to the third voltage pulse, the switches 23, 22 and 26 are switched to a blocking state and the switches 21, 25 and 24 are switched to a conductive state. During the fourth voltage pulse the current measured with the common current sensor 3 corresponds to the current I through the second phase winding B, wherein the current I flows in the negative direction, thus away from the star point X, through the first phase winding B.

Figure 7:
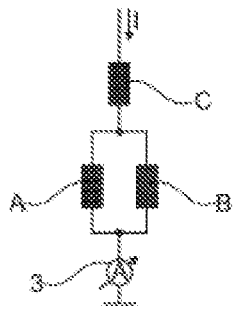

FIG. 7 shows an interconnection of the phase windings A, B, C during a fifth voltage pulse. The fifth voltage pulse is applied via a series connection of the third phase winding C, which is assigned to the voltage pulse, with a parallel connection of the first phase winding A, and of the second phase winding B. To this end, the switches 21, 24 and 26 are switched to a conductive state and switches 23, 25 and 22 are switched to a blocking state. During the fifth voltage pulse the current measured with the common current sensor 3 corresponds to the current I through the third phase winding C, wherein the current I flows in the positive direction, thus towards the star point X, through the third phase winding C.

Figure 8:
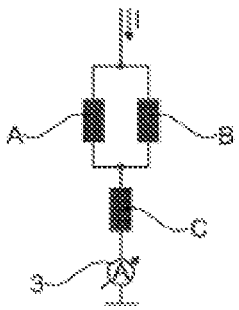

FIG. 8 shows an interconnection of the phase windings A, B, C during a sixth voltage pulse. The sixth voltage pulse, similar to the fifth voltage pulse, is applied via a series connection of the third phase winding C, which is assigned to the voltage pulse, with a parallel connection of the first phase winding A and of the second phase winding B. In contrast to the fifth voltage pulse, the switches 21, 24 and 26 are switched to a blocking state and the switches 23, 25 and 22 are switched to a conductive state. During the sixth voltage pulse the current measured with the common current sensor 3 corresponds to the current I through the third phase winding C, wherein the current I flows in the negative direction, thus away from the star point X, through the third phase winding C. In this respect, the voltage pulses of the voltage pulse sequence are selected in such a manner that at least one positive and one negative current is produced in all the phase windings during the voltage pulse sequence, wherein the negative current flows in the opposite direction to the positive current. The voltage pulses can be arranged in any sequence in the voltage pulse sequence 100.

In each case, a time delay T is provided between the voltage pulses of the voltage pulse sequence 100, said time delay in which no voltage is applied via the phase windings A, B, C. The voltage pulses each have a pulse duration D, which is identical for all voltage pulses of the voltage pulse sequence. The time delay between the voltage pulses of all voltage pulses of the voltage pulse sequence 100 may be identical, so that a periodic voltage pulse sequence with a predefined frequency arises. The frequency of the voltage pulse sequence may be greater than the speed of the rotor 11, particularly at least greater by a factor of 10 than the speed of the rotor 11, for example at least greater by a factor of 100 than the speed of the rotor 11.

Figure 9:
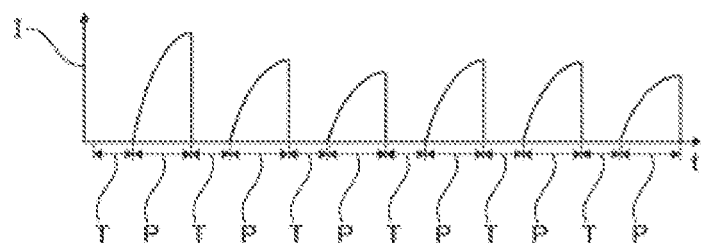
FIG. 9 shows a schematic representation of the current measured by the common current sensor during the voltage pulse sequence and FIG. 10 shows a flow chart of a second exemplary embodiment of the method.

FIG. 9 shows the behavior of the current I measured by the common current sensor 3 during the voltage pulse sequence 100. It can be seen that the current I is zero during the time delay T between the individual voltage pulses. During the duration P of a voltage pulse the current I rises in each case until it reaches a peak current value at the end of the voltage pulse. At the end of the voltage pulse this peak current value is measured and stored by the common current sensor 3. The storage of the peak current value can take place for example in the evaluation circuit 6. Since the common current sensor 3 is arranged in the lead 5 of the inverter 2, the measured current I always has the same polarity, regardless of which direction the current I flows in the respective phase winding A, B, C.

After that the evaluation circuit 6 determines the voltage pulse of the voltage pulse sequence 100 during which the peak current value having the greatest magnitude was measured. Since the inductivities of the phase windings A, B, C are influenced by the position of the permanent-magnet rotor 11, the voltage pulse during whose duration P the peak current value having the greatest magnitude that was measured indicates that the magnetic field lines of the rotor 11 during the duration P of this voltage pulse were aligned essentially parallel to the field lines of the phase winding A, B, C, which is assigned to this voltage pulse. Hence, by observing the voltage pulse in the voltage pulse sequence during which the peak current value having the greatest magnitude was measured, the position can be determined with a resolution of 60° electrical angle. Optionally, in addition the voltage pulse is determined during which the peak current value having the second greatest magnitude was measured. This voltage pulse can be used in addition to determining the position of the rotor 11, as a result of which the resolution of the determined position of the rotor 11 can be lowered to 30° electrical angle.

Figure 10:
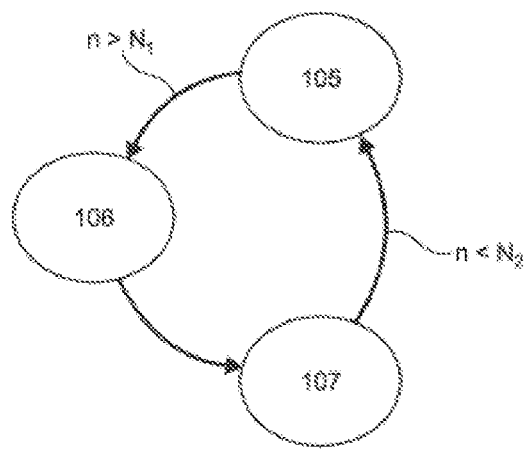

Subsequently, a second exemplary embodiment of the method according to the disclosure shall be explained with the aid of the representation in FIG. 10. In this embodiment the speed n of the electric motor 10 is determined. If the speed n is less than a first predefined speed threshold N1, the determination of the position of the rotor will be carried out with the aid of the voltage sequence as in the method 105 according to the first exemplary embodiment. If the speed n proceeding from a speed n that is lower than the first predefined speed threshold N1 reaches or exceeds the first speed threshold N1, the position of the rotor 11 is determined via a method 107 for determining a back EMF of the electric motor 10. Further, if the speed n proceeding from a speed n that is lower than the predefined first speed threshold N1 reaches or exceeds the first speed threshold N1, a control cycle 106 for controlling the phase winding A, B, C is executed with an extended duty cycle of the control pulses compared to the immediately preceding control cycle.

If the speed n proceeding from a speed n that is greater than the first speed threshold N1 falls below a second predefined speed threshold N2, the determination of the position of the rotor 11 is however carried out by the method 105 with the aid of the voltage sequence. The second predefined speed threshold N2 may be lower than the first predefined speed threshold N1.

REFERENCE LIST

1 Circuit arrangement
2 Inverter
3 Current sensor
4 Lead
5 Lead
6 Evaluation circuit
10 Electric motor
11 Rotor
21 Switch
22 Switch
23 Switch
24 Switch
25 Switch
26 Switch
100 Voltage pulse sequence
101 Control cycle
105 Determining the position of the rotor with the voltage pulse sequence
106 Intermediate step
107 Determining the position of the rotor with the aid of the counter EMF
A, B, C Phase winding
I Current
n Speed
N Magnetic pole
N1, N2 Speed threshold
P Duration of a voltage pulse
S Magnetic pole
T Time delay
U, V, W Potential point
X Star point

The invention claimed is:

1. A method for determining a position of a camshaft adjuster or the position of a device for changing a compression ratio of an internal combustion engine having a brushless permanent-magnet electric motor having a rotor and a stator which include a plurality of phase windings, comprising:
exciting the plurality of phase windings via a sequence of voltage pulses;
providing a plurality of successive voltage pulses, such that a current is set successively in each of the phase windings;
selecting voltage pulses such that a positive and a negative current is produced in all the phase windings during the voltage pulse sequence;
measuring a peak value for the current being set in the respective phase winding during a duration of each voltage pulse using a common current sensor; and
determining the voltage pulse in the voltage pulse sequence during the duration when the peak current value having the greatest magnitude was measured, wherein the voltage pulse determined during the duration of which the peak current value having a second greatest magnitude was measured.

2. The method of claim 1, wherein the voltage pulses of the voltage pulse sequence are in each case applied with a parallel connection of the other phase windings via a series connection of a first phase winding, to which the voltage pulse is assigned, in particular with a parallel connection of a second phase winding and of a third phase winding.

3. The method of claim 1, wherein in each case a time delay is provided between the voltage pulses of the voltage pulse sequence, the time delay in which no voltage is applied via the phase windings.

4. The method of claim 1, wherein the phase windings are excited with the voltage pulse sequence in a time frame which is between two control cycles for controlling the phase windings, in particular two PWM control cycles.

5. The method according to claim 4, wherein the phase windings are excited during control cycles in such manner that a first phase winding is disconnected while a second phase winding and a third phase winding are live.

6. The method of claim 1, wherein the voltage pulse sequence or control cycles are produced with an inverter including a B6 bridge circuit.

7. The method of claim 1, wherein the method further includes determining a speed of the rotor of the electric motor and the excitation of the phase windings for determining the position of the rotor occurs with the voltage pulse sequence when the speed is less than a predefined speed threshold, and the position of the rotor is determined via a determination of a back EMF of the electric motor when the speed proceeding from a speed that is lower than the predefined speed threshold reaches or exceeds the speed threshold.

8. The method of claim 7, when the speed proceeding from a speed that is lower than the predefined speed threshold reaches or exceeds the speed threshold, a control cycle to control the phase windings is executed with an extended duty cycle of control pulses compared to an immediately preceding control cycle.

9. A circuit arrangement of a camshaft adjuster, comprising:
a plurality of phase windings;
an inverter configured to excite the phase windings utilizing a sequence of voltage pulses that includes a plurality of successive voltage pulses that a current can be set successively in each of the phase windings, wherein the voltage pulses are selected in such a manner that a positive and a negative current are produced in all the phase windings during the voltage pulses;
a common current sensor for measuring a peak value for the current being set during a duration of each voltage pulse in the respective phase winding; and
an evaluation circuit for determining the voltage pulse in the voltage pulse sequence during the duration of which the peak current value having the greatest magnitude was measured, wherein the phase windings are excited during control cycles in such manner that a first phase winding is disconnected while a second and a third phase winding are live.

10. The circuit arrangement of claim 9, wherein the plurality of phase windings surround a rotor of an electrical motor.

11. The circuit arrangement of claim 9, wherein the plurality of phase windings include exactly three phase windings.

12. The circuit arrangement of claim 11, wherein the three phase windings are further configured to produce six voltage pulses that produce positive and negative currents in the three phase windings.

13. The circuit arrangement of claim 9, wherein the common current sensor is arranged on a DC voltage side lead of the inverter.

14. A circuit, comprising:
a plurality of phase windings in an electric motor;
an inverter configured to excite the phase windings by a sequence of voltage pulses including a plurality of successive voltage pulses that a current can be set in each of the phase windings, wherein the voltage pulses are selected in such a manner that a positive and a negative current are produced in all the phase windings during the voltage pulses;
a current sensor for measuring a peak value for the current being set during a duration of each voltage pulse in each phase winding; and
an evaluation circuit connected to the current sensor, wherein the evaluation circuit is configured to determine the voltage pulse in the voltage pulse sequence during a duration of which peak current value having a greatest magnitude was measured, wherein the inverter includes a plurality of power semiconductor switches, wherein a first set of the plurality of power semiconductor switches are switched to a conductive state, and a second set of the plurality of power semiconductor switches are switched to a blocking state in response to a first voltage pulse.

15. The circuit of claim 14, wherein the first set of the plurality of power semiconductor switches are switched to a blocking state and the second set of the plurality of power semiconductor switches are switched to a conductive state in response to a second voltage pulse.

16. The circuit of claim 14, wherein the evaluation circuit is configured to utilize peak current values being set during different voltage pulses to determine a rotor position.

\* \* \* \* \*